M. J. COLLINS.
STRIPPING COMB.
APPLICATION FILED MAY 12, 1921.
1,407,638.
Patented Feb. 21, 1922.
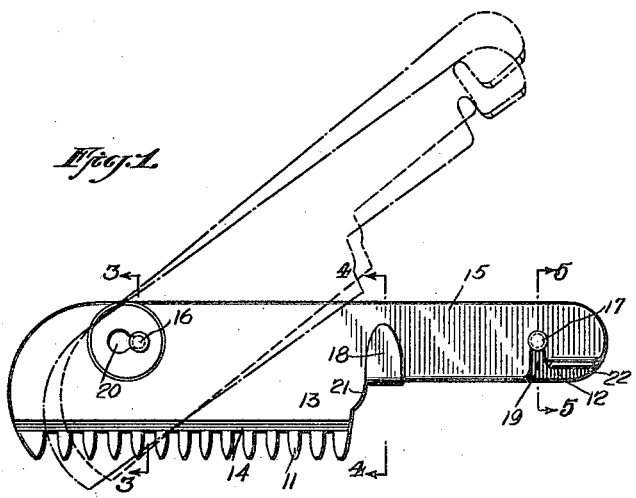
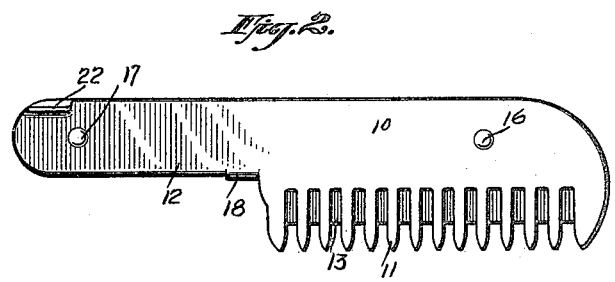
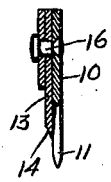  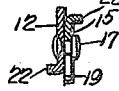
WITNESSES
INVENTOR
MICHAEL J. COLLINS.
BY
ATTORNEYS

UNITED STATES PATENT OFFICE.

MICHAEL JOHN COLLINS, OF NEW YORK, N. Y.

STRIPPING COMB.

1,407,638.    Specification of Letters Patent.    Patented Feb. 21, 1922.

Application filed May 12, 1921. Serial No. 469,005.

*To all whom it may concern:*

Be it known that I, MICHAEL J. COLLINS, a citizen of the United States, and resident of the city of New York, borough of Manhattan, county of New York, and State of New York, have invented a new and Improved Stripping Comb, of which the following is a full, clear, and exact description.

My invention relates to a comb, and more particularly a stripping comb.

It is well appreciated in connection with such combs as are utilized for currying the coats of dogs such as terriers, preparatory to exhibiting them in a show that considerable difficulty has been experienced.

More particularly this difficulty is to be attributed to the fact that the combs heretofore provided have not held their cutting edge for any length of time, and it has been extremely difficult to treat this edge so as to renew the same after it has become dull. Furthermore the combs heretofore provided have, for the most part quickly become unsightly, and difficulty has been experienced in properly cleansing the same.

Thus the object of my present invention is to provide a comb, and more particularly a stripping comb such as is utilized in the grooming of dogs of the class specified, by means of which an operator will at all times have an instrument available which will be in perfect condition for use, in that the cutting edge may be readily sharpened, and the comb readily and quickly cleansed.

Further objects of my invention will become apparent from the annexed specification taken in connection with the drawings, which latter present one practical embodiment of the same, and in which;

Figure 1 is a side view of a comb embodying my improved construction.

Figure 2 is also a side view, but taken upon the side of the comb opposite from that presented in Figure 1, and Figures 3, 4 and 5 are transverse sectional views taken along the lines 3—3, 4—4 and 5—5 respectively of Figure 1 and in the direction of the arrows indicated in this figure.

My invention contemplates the use of a comb body 10 which is formed with teeth 11 in one of its faces, and also preferably provides a shank or handle portion 12, all of this preferably forming an integral part.

With a view of providing a cutting member I preferably utilize an element presenting a body portion 13, having a cutting edge 14 and being also formed with a shank portion 15 substantially corresponding to the handle or shank 12 of the comb 10. It is to be noted in this connection that the entire shape of the cutting member conforms in outline substantially to the shape of the comb with the exception that the width of the body portion 13, presenting the cutting edge 14 is not as wide as that of the comb 10 taken together with the teeth 11, so that the cutting edge 14 is spaced from the outer ends of the teeth 11 although lying flush against their faces.

To provide means which will serve to couple the comb and blade one to the other, and by means of which these elements may quickly be detached from each other, it will be noted that a headed pin 16 is associated with the comb 10, a secondary pin 17 of a similar nature being secured thereto at a point adjacent the outer end of the shank 12. Further the comb is formed adjacent the point of connection of the handle with the body 10 thereof, with a lip 18 preferably forming an integral portion of the comb, and providing sufficient space between its inner face and the comb to form a seat for the reception of the shank 15 of the cutting member.

The latter member is formed with portions adapted to co-operate with the pins 16 and 17, and thus the handle or shank of the cutting member is provided with a recess 19 in its lower edge suitable for co-operation with the pin 17, it being noted that the forward end of the cutting member provides a key hole opening 20 adapted to co-operate with the shank of the pin 16.

Thus it will be obvious that an operator desiring to effect an engagement of the two elements may permit the headed portion of the pin 16 to extend through the opening 20 of the cutting member subsequent to which the latter is slid to a position at which the shank of the pin 16 lies within the reduced portion of the opening 20 whereby to prevent any detachment of one of the members from the second of the same. Subsequently the handle 15 of the cutting member is swung downwardly and in the event that an operator has not properly seated the pin 16 within the opening 20 it will be obvious that this will be automatically effected by virtue of the curved portion 21 of the cutting member, co-operating with the edge of the lip 18 during this swinging operation, in that the entire cutting member will be pushed forwardly with respect to the comb and thus the pin 16 will be properly seated within the opening 20. A further movement of the cutting member will result in the handle 15 thereof seating, as has been indicated in Figure 4 at which point the pin 17 will rest within the recess 19 whereby obviously any movement of the parts other than a swinging will be prevented, the latter motion being also normally precluded by virtue of the friction existing between the lip 18 and handle 15, as well as the fact that the operator's hands encircle both the handles 15 and 12, thus obviously preventing any movement of one with respect to the other.

Thus it will be appreciated that the objects set forth in the preamble of this specification will have been accomplished, in that the cutting member may readily be separated from the comb for a purpose of sharpening or permitting a cleansing of both of the elements, although the same are normally held rigid with respect to each other. It is also to be noted that a deliberate detachment of the members one from the other is facilitated by virtue of the fact that the lower and upper edges of the shanks 15 and 12 respectively are provided adjacent their outer ends with outwardly extending portions 22 permitting the operator to grasp these portions to swing one of the members with respect to the other.

Obviously numerous modifications of structure might readily be resorted to without in the least departing from the spirit of my invention, which I claim as:

1. A stripping comb including a cutting member, a comb, handles forming a part of both of said members, a pin attached to one of said members and being adapted to extend into a key hole opening formed in the second of said members, whereby to lock the same with respect to each other, said members being adapted to be swung with respect to each other, and means for automatically seating said pin within said opening during said swinging operation.

2. A stripping comb including a cutting member, a comb, handles forming a part of both of said members, a pin attached to one of said members and being adapted to extend into a key hole opening formed in the second of said members, whereby to lock the same with respect to each other, said members being adapted to be swung with respect to each other, one of said members being formed with a curved side edge, a fixed portion forming a part of said second member whereby upon said members being swung with respect to each other, said curved edge will engage said fixed member to effect a movement of said members with respect to each other, and a seating of said pin within said opening.

MICHAEL JOHN COLLINS.